(12) United States Patent
Hwang

(10) Patent No.: US 11,243,444 B2
(45) Date of Patent: Feb. 8, 2022

(54) DISPLAY DEVICE

(71) Applicant: SAMSUNG DISPLAY CO., LTD., Yongin-si (KR)

(72) Inventor: Young Soo Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 152 days.

(21) Appl. No.: 16/663,565

(22) Filed: Oct. 25, 2019

(65) Prior Publication Data

US 2020/0209696 A1 Jul. 2, 2020

(30) Foreign Application Priority Data

Dec. 28, 2018 (KR) .................... 10-2018-0172406

(51) Int. Cl.
*G02F 1/1362* (2006.01)

(52) U.S. Cl.
CPC .... *G02F 1/136286* (2013.01); *G02F 1/13624* (2013.01); *G02F 1/13629* (2021.01)

(58) Field of Classification Search
None
See application file for complete search history.

(56) References Cited

U.S. PATENT DOCUMENTS

| | | | | |
|---|---|---|---|---|
| 2009/0002264 A1* | 1/2009 | Pai | ........................ | G09G 3/3666 345/3.2 |
| 2014/0009458 A1* | 1/2014 | Nam | .................... | G09G 3/3607 345/212 |
| 2015/0084941 A1* | 3/2015 | He | ........................ | G09G 3/3614 345/209 |
| 2016/0321984 A1* | 11/2016 | Kim | .................... | G09G 3/3614 |
| 2018/0069072 A1 | 3/2018 | Kajiyama et al. | | |

* cited by examiner

*Primary Examiner* — Amare Mengistu
*Assistant Examiner* — Sarvesh J Nadkarni
(74) *Attorney, Agent, or Firm* — F. Chau & Associates, LLC

(57) ABSTRACT

A display device includes a display panel, a timing controller, a first source driver, and a second source driver. The display panel includes a first pixel, a second pixel and a plurality of data lines included in a pixel column. A first data line is connected to the first pixel, and a second data line is connected to the second pixel. The timing controller generates a pattern inversion control signal by detecting a predetermined image pattern from input data. The first source driver is connected to the first and third data lines, and replaces a first channel data corresponding to the first data line with a third channel data corresponding to the third data line in response to the pattern inversion control signal. Similarly, the second source driver replaces a second channel data corresponding to the second data line with a fourth channel data corresponding to the fourth data line.

18 Claims, 10 Drawing Sheets

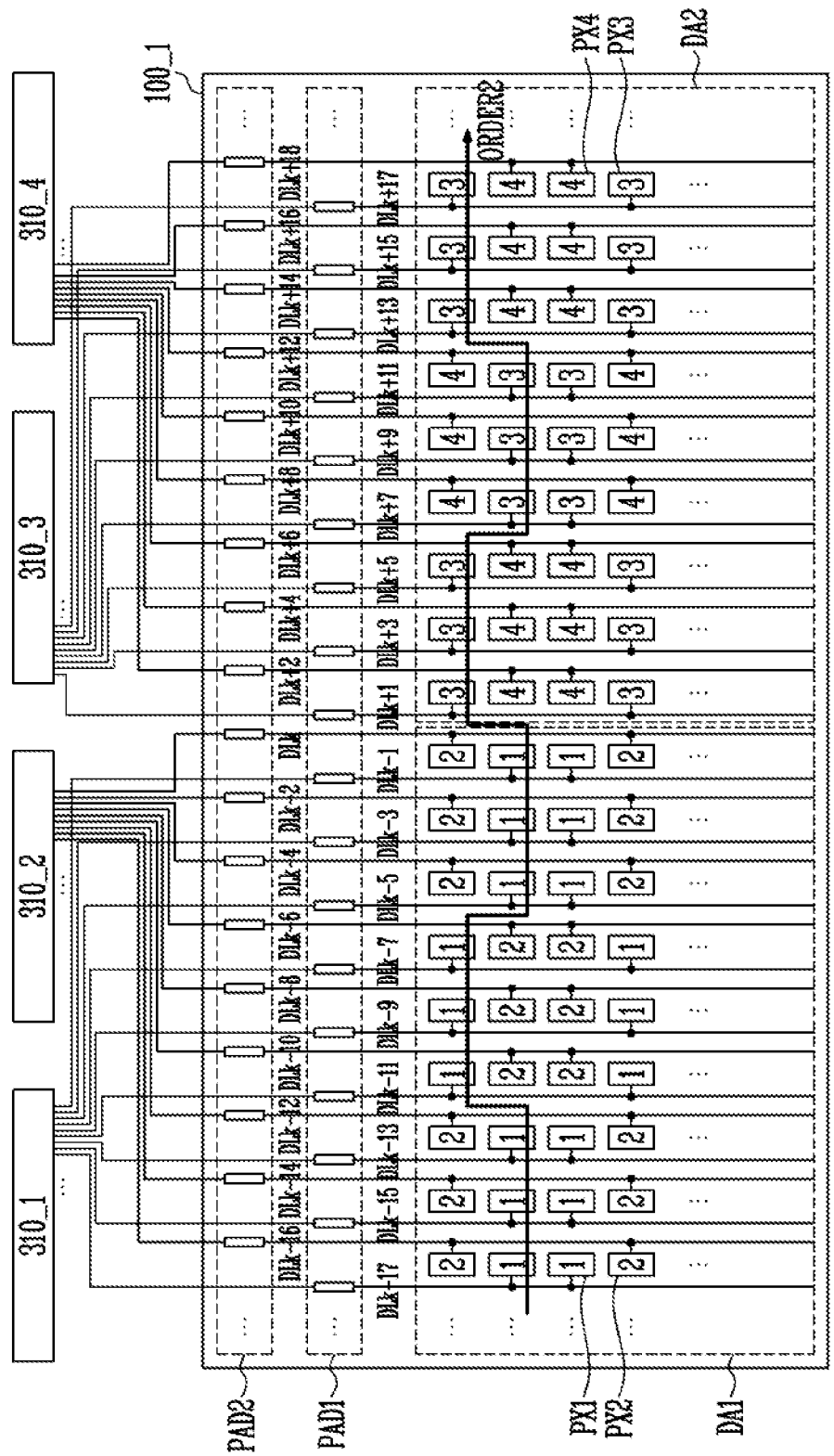

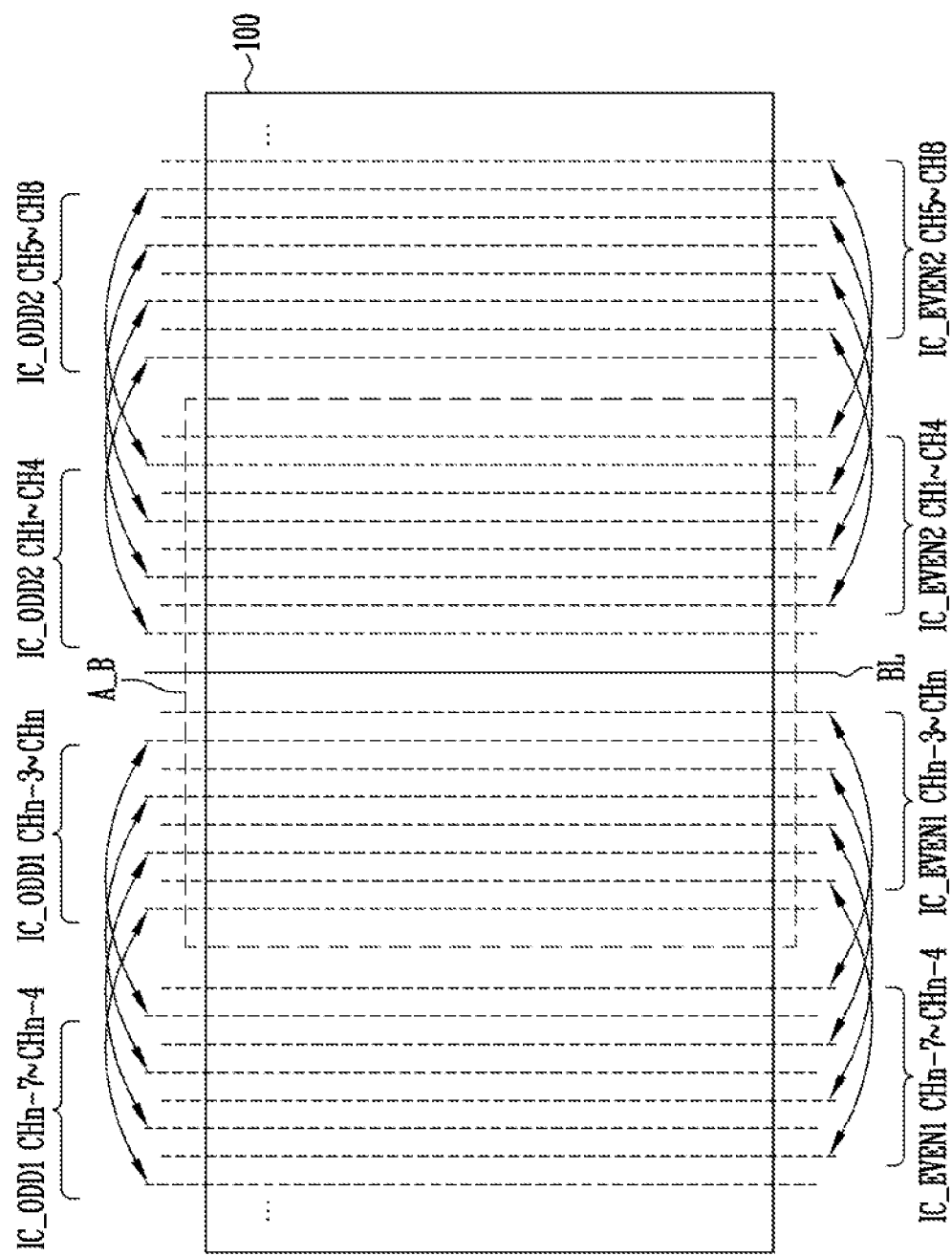

DISPLAY DEVICE

CROSS-REFERENCE TO RELATED APPLICATION

This application claims priority to and the benefit of Korean Patent Application No. 10-2018-0172406 filed in the Korean Intellectual Property Office on Dec. 28, 2018, the entire contents of which are incorporated by reference herein.

BACKGROUND OF THE INVENTION

1. Field of the Invention

The present invention relates to a display device.

2. Description of the Related Art

A liquid crystal display is type of flat panel display that includes two substrates (i.e., a field generating electrode and a common electrode) and a liquid crystal layer interposed between them. A liquid crystal display generates an electric field in the liquid crystal layer by applying a voltage to the field generating electrode, thereby determining a direction of liquid crystal molecules in the liquid crystal layer and controlling polarization of incident light to display an image.

A liquid crystal display may apply optical compensation to image data to eliminate imbalance between pixels (e.g., luminance deviation between pixels) caused by characteristics of the display device itself, or by process deviation. However, for large-sized, high definition display devices, and for devices where the pixels have certain structural arrangements, the imbalance between the pixels cannot be solved by optical compensation alone. Furthermore, the display quality of an image may deteriorate due to the compensation error in the optical compensation.

SUMMARY OF THE INVENTION

An exemplary embodiment of the present invention provides a display device capable of alleviating deterioration in the display quality of an image due to compensation error.

A display device according to exemplary embodiments of the present invention includes a display panel that includes a first pixel, a second pixel and a plurality of data lines included in a pixel column, wherein a first data line of the data lines is connected to the first pixel and a second data line of the data lines is connected to the second pixel; a timing controller that generates a pattern inversion control signal by detecting a predetermined image pattern from input data; a first source driver that is connected to the first data line and a third data line of the data lines, and replaces a first channel data corresponding to the first data line with a third channel data corresponding to the third data line in response to the pattern inversion control signal; and a second source driver that is connected to the second data line and a fourth data line of the data lines, and replaces a second channel data corresponding to the second data line with a fourth channel data corresponding to the fourth data line in response to the pattern inversion control signal.

A method is described for correcting a compensation error, the method comprising detecting a predetermined image pattern from input data; generating a pattern inversion control signal based on detecting the predetermined image pattern; replacing at least one first channel data corresponding to at least one first data line at a border region of a pixel compensation region with at least one second channel data corresponding to at least one second data line based on the pattern inversion control signal.

According to an exemplary embodiment of the present invention, the first source driver may be connected to a fifth data line of the data lines, and the first source driver may not replace a fifth channel data corresponding to the fifth data line with other channel data while replacing the first channel data with the third channel data.

According to an exemplary embodiment of the present invention, the first data line, the second data line, the third data line and the fourth data line may be sequentially arranged.

According to an exemplary embodiment of the present invention, the display panel may include a first display region and a second display region separated by the data lines, and the first data line and the second data line may be disposed in the first display region and are the closest to the second display region.

According to an exemplary embodiment of the present invention, the display device may further include a third source driver and a fourth source driver that are connected to data lines included in the second display region, wherein the third source driver may be connected to a fifth data line and a seventh data line in the second display region, and replace a fifth channel data corresponding to the fifth data line with seventh channel data corresponding to the seventh data line in response to the pattern inversion control signal, and the fourth source driver may be connected to a sixth data line and an eighth data line in the second display region, and replace a sixth channel data corresponding to the sixth data line with an eighth channel data corresponding to the eighth data line in response to the pattern inversion control signal.

According to an exemplary embodiment of the present invention, the fifth data line and the sixth data line may be disposed in the second display region and be the closest to the first display region.

According to an exemplary embodiment of the present invention, the display panel may further include a third pixel connected to the third data line and a fourth pixel connected to the fourth data line, wherein the second pixel and the third pixel may be included in one pixel row, and the first pixel and the fourth pixel may be included in one pixel row.

According to an exemplary embodiment of the present invention, the first pixel and the second pixel may emit a first color, and the third pixel and the fourth pixel may emit a second color.

According to an exemplary embodiment of the present invention, the first source driver may include an input buffer that converts line data transmitted from the timing controller through a pair of signal transmission lines into parallel data corresponding to the data lines; and an image signal processor that generates data signals based on the parallel data, wherein the line data may be generated based on the input data in the timing controller, and the parallel data includes the first channel data and the third channel data, and wherein the image signal processor may include channel lines and a first switch connected between a first channel line corresponding to the first channel data and a third channel line corresponding to the third channel data of the channel lines.

According to an exemplary embodiment of the present invention, the image signal processor may further include a second switch connected between the first channel of the input buffer outputting the first channel data and the first channel line.

According to an exemplary embodiment of the present invention, when the pattern inversion control signal is at a logic high level, the first switch may be turned on and the second switch may be turned off.

According to an exemplary embodiment of the present invention, when the pattern inversion control signal is at a logic low level, the first switch may be turned off and the second switch may be turned on.

According to an exemplary embodiment of the present invention, the image signal processor may further include a third switch connected between a fifth channel line corresponding to a fifth channel data of the channel lines and the third channel line.

According to an exemplary embodiment of the present invention, the line data may correspond to one pixel row in the display panel, and the line data may include the pattern inversion control signal.

According to an exemplary embodiment of the present invention, the timing controller may include a first comparator that compares the first channel data with the third channel data, the second comparator that compares the second channel data with the fourth channel data, and a logic operator that generates the pattern inversion control signal by calculating a logical conjunction of an output of the first comparator and an output of the second comparator.

A display device according to exemplary embodiments of the present invention includes a display panel that includes data lines, first pixels connected to odd-numbered data lines of the data lines, and second pixels connected to even-numbered data lines of the data lines, wherein one of the first pixels and one of the second pixels is included in a pixel column; a timing controller that generates a pattern inversion control signal based on input data; a first source driver that is connected to the odd-numbered data lines and provides the same first data signal to a first odd-numbered data line of the odd-numbered data lines and a second odd-numbered data line adjacent to the first odd-numbered data line in response to the pattern inversion control signal; and a second source driver that connected to the even-numbered data lines and provides the same second data signal to a first even-numbered data line of the even-numbered data lines and a second even-numbered data line adjacent to the first even-numbered data line in response to the pattern inversion control signal.

According to an exemplary embodiment of the present invention, the display panel may include a first display region and a second display region separated by the data lines, the first source driver and the second source driver may be connected to data lines included in the first display region, the first odd-numbered data line may be the closest to the second region of the odd-numbered data lines, and the second even-numbered data line may be the closest to the second region of the even-numbered data lines.

According to an exemplary embodiment of the present invention, the display device may further include the third source driver and the fourth source driver that are connected to the data lines included in the second display region, wherein the third source driver and the fourth source driver may be connected to data lines in the second display region, the third source driver may provide the same third data signal to a third odd-numbered data line and a fourth odd-numbered data line adjacent to the third odd-numbered data line of the odd-numbered data lines in response to the pattern inversion control signal, and the fourth source driver may provide the same fourth data signal to a third even-numbered data line and a fourth even-numbered data line adjacent to the third even-numbered data line of the even-numbered data lines in response to the pattern inversion control signal.

According to an exemplary embodiment of the present invention, the display panel may further include a third pixel connected to the second odd-numbered data line and a fourth pixel connected to the second even-numbered data line, the second pixel and the third pixel may be included in one pixel row, and the first pixel and the fourth pixel may be included in one pixel row.

According to an exemplary embodiment of the present invention, the first pixel and the second pixel may emit a first color, and the third pixel and the fourth pixel may emit a second color.

The display device according to an exemplary embodiment of the present invention provides a data signal in a region where deterioration in display quality does not occur to a region where the deterioration in the display quality is expected by determining whether or not the compensation error has occurred, thereby alleviating the deterioration in the display quality of an image due to the compensation error.

BRIEF DESCRIPTION OF THE DRAWINGS

FIGS. 2A to 2C are a drawing showing an example of the display device shown in FIG. 1 according to exemplary embodiments of the present invention.

FIG. 3 is a drawing illustrating replacement of channel data by a data driver included in the display device shown in HG. 1 according to exemplary embodiments of the present invention.

DETAILED DESCRIPTION OF THE EMBODIMENTS

Figure 1:
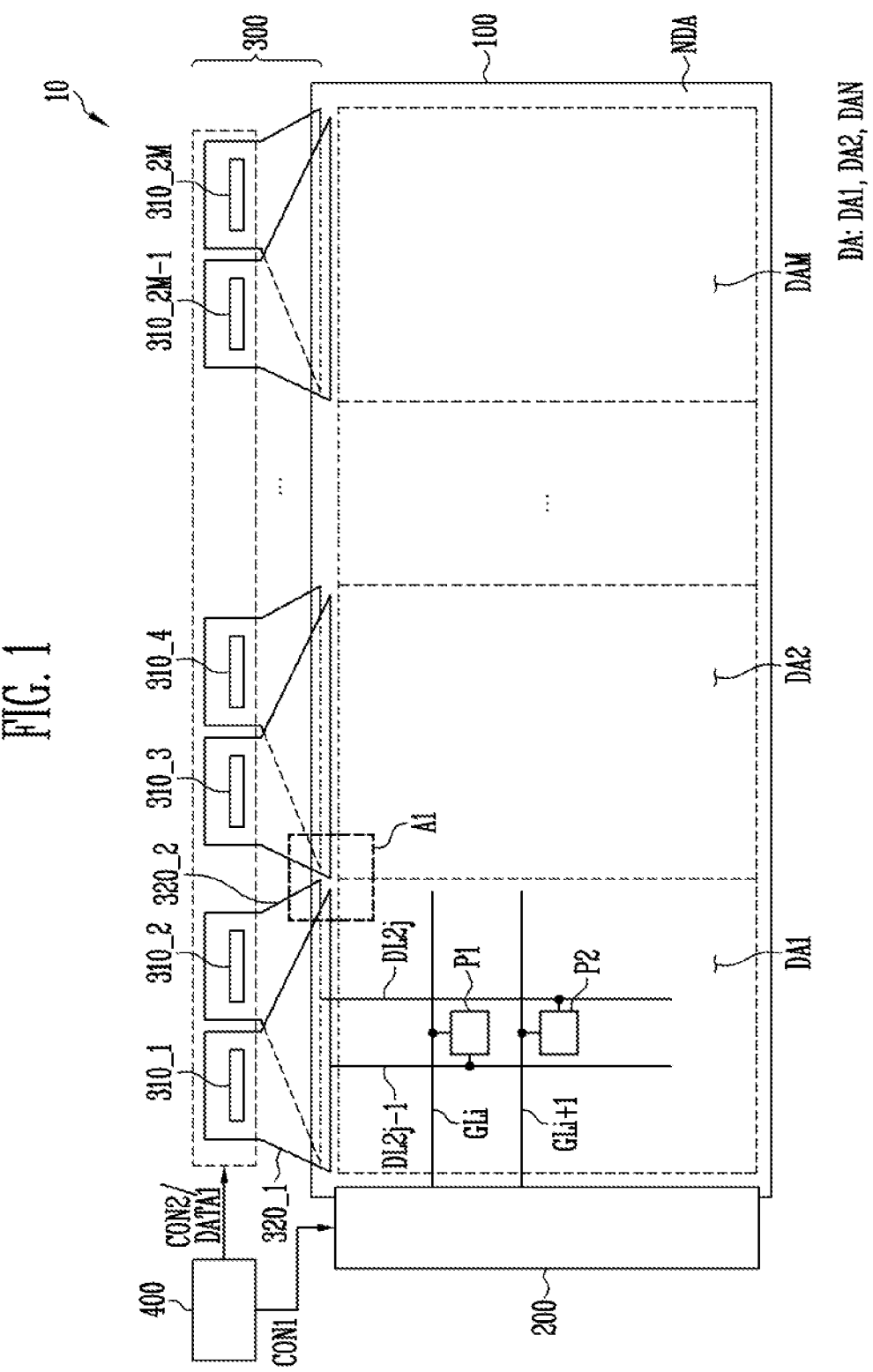
FIG. 1 is a drawing showing a display device according to exemplary embodiments of the present invention.

Hereinafter, with reference to accompanying drawings, various exemplary embodiments of the present invention will be described in detail so that those skilled in the art can easily carry out the present invention. The present invention may be embodied in many different forms and is not limited to the exemplary embodiments described herein.

The pixels of a display device (e.g., a liquid crystal display) may gradually deteriorate as the device is used. Some devices are configured to compensate for this deterioration by applying a compensation signal to modify the luminance of different pixel regions. However, in some cases, this compensation may result in degradation of the image at the boundary of the pixel regions. For example, the compensation may not take into account a staggered arrangement of the pixels.

Embodiments of the invention relate to a display device that is configured to compensate for image degradation due to compensation errors at the boundaries of different pixel regions. For example, image degradation may be expected in certain image data channels near the region boundary in certain conditions. If the device detects a condition where image degradation is likely, it may correct the error by replacing the channel sent to pixels along lines at the boundary with data from corresponding lines further from the region boundary. As a result, image degradation may be prevented from becoming detectable by a user.

In order to clearly illustrate the present invention, parts that are not related to the description are omitted, and the same or similar constituent elements are given the same reference numerals throughout the specification. Therefore, the above-mentioned reference numerals can be used in other drawings.

In addition, since the size and thickness of each configuration shown in the drawing are arbitrarily shown for better understanding and ease of description, the present invention is not necessarily limited to the illustrated one. In the drawings, the dimensions of layers and regions are exaggerated for clarity of illustration.

FIG. 1 is a drawing showing a display device according to exemplary embodiments of the present invention. FIG. 1 shows a liquid crystal display (LCD), but the present invention is not limited thereto. For example, exemplary embodiments of the present invention may be applied to other types of display devices such as an organic light emitting diode (OLED) display device.

Referring to FIG. 1, the display device 10 includes a display panel 100, a gate driver 200 (or a scan driver), a data driver 300, and a timing controller 400.

The display panel 100 may include a display region DA for displaying an image and a non-display region NDA outside the display region. The display panel 100 may also include gate lines GLi, and GLi+1 (where i is a positive integer), data lines DL2$j$−1 and DL2$j$ (where j is a positive integer) and pixels P1 and P2. The gate lines GLi and GLi+1 may extend in the row direction and may be arranged along the column direction. The data lines DL2$j$−1 and DL2$j$ may extend in the column direction and may be arranged along the row direction.

Each of pixels P1 and P2 may be disposed in regions partitioned by the gate lines GLi and GLi+1 and the data lines DL2$j$−1 and DL2$j$) in the display region DA. A pixel column may include a first pixel P1 and a second pixel P2. The first pixel P1 corresponds to a pixel connected to a first data line DL2$j$−1 (or, an odd-numbered data line) of the data lines DL2$j$−1 and DL2$j$, and the second pixel P2 corresponds to a pixel connected to a second data line DL2$j$ (or, an even-numbered data line).

The first pixel P1 may be electrically connected to the gate line GLi and the first data line DL2$j$−1, may receive a first data signal through the first data line DL2$j$−1 in response to a gate signal provided through the gate line GLi, and may display luminance corresponding to a data signal by controlling an amount of light emitted from a backlight (not shown) corresponding to the first data signal. For example, the first pixel P1 may include a switch, a liquid crystal capacitor and a storage capacitor. The switch may be electrically connected to the gate line GLi and the first data line DL2$j$−1, the liquid crystal capacitor may be connected to the switch, and the storage capacitor may be connected to a liquid crystal capacitor. In another example, the first pixel P1 may include a switch, an organic light emitting diode, and a storage capacitor.

Similarly, the second pixel P2 may be electrically connected to the gate line GLi+1 and the second data line DL2$j$, may receive a second data signal through the second data line DL2$j$ in response to a gate signal provided through the gate line GLi+1, and may display luminance corresponding to a data signal by controlling an amount of light emitted from the backlight (not shown) corresponding to the second data signal.

The gate driver 200 and the data driver 300 may drive the display panel 100.

The gate driver 200 may receive a first control signal CONT1 (i.e., a gate control signal, or a scan control signal) from the timing controller 400, generate a gate signal based on the first control signal CONT1, and provide the gate signal to the gate lines GLi and GLi+1. The gate driver 200 may include a shift register that sequentially outputs the gate signal.

The data driver 300 may receive a second control signal CONT2 (or data control signal) and image data DATA1 from the timing controller 400, generate data signals corresponding to the image data DATA1, and provide the data signals to the data lines DL2$j$−1 and DL2$j$.

In an exemplary embodiment of the present invention, the data driver 300 may include a plurality of data drive ICs 310_1 to 310_2M (where M is a positive integer). Two adjacent data drive ICs 310_1 to 310_2M may form a pair to provide the data signals to one of a plurality of sub-display regions DA1 to DAM. The sub-display regions DA1 to DAM may be included in the display region DA, and may be separated from each other based on the data lines DL2$j$−1 and DL2$j$. In addition, odd-numbered data drive ICs 310_1, 310_3, and 310_2M-1 may be connected to an odd-numbered data line (e.g., a first data line DL2$j$−1) through a first printed circuit substrate 320_1, and each even-numbered data drive IC 310_2, 3104 and 310_2M may be connected to an even-numbered data line (e.g., a second data line DL2$j$) through a second printed circuit substrate 320_2.

For example, a first data drive IC 3101 and a second data drive IC 310_2 may provide data signals in a first sub-display region DA1 (or the first display region), while the first data drive IC 310_1 may provide the first data signal to the first data line DL2$j$−1 in the first sub-display region DA1, and the second data drive IC 310_2 may provide the second data signal to the second data line DL2$j$ in the first sub-display region DA1.

An example of a specific connection configuration between the data drive ICs 310_1 to 310_2M and the data lines DL2$j$−1 and DL2$j$ will be described later with reference to FIGS. 2A to 2C.

In exemplary embodiments, the data drive ICs 310_1 to 310_2M may replace a data signal (or a channel data corresponding to a data signal) provided to some data lines of the data lines DL2$j$−1 and DL2$j$ with an adjacent data signal in response to a pattern inversion control signal, or may share the adjacent data signal with some data lines. The pattern inversion control signal may be provided from the timing controller 400, and the adjacent data signal may be a data signal provided to other adjacent data lines.

For example, each of the data drive ICs (310_1 to 310_2M) may provide a data signal (i.e., an adjacent data signal) provided to four other data lines adjacent to the four data lines instead of a data signal to be provided to the four data lines adjacent to a boundary between sub-display regions DA1 to DAM. Each of the data drive ICs 310_1 to 310_2M replaces only the data signal provided to data lines adjacent to the boundary with the adjacent data signal, and does not perform a replacement operation for data signals provided to other data lines.

Examples of specific configurations for replacing the data signal (or channel data) in the data drive ICs 310_1 to 310_2M will be described later with reference to FIGS. 3 and 4.

The timing controller 400 may control the gate driver 200 and the data driver 300. The timing controller 400 may receive a control signal (e.g., a control signal including a clock signal) from an external source (not shown) and generate a first control signal CONT1 and a second control signal CONT2 based on the external control signal.

In addition, the timing controller 400 may generate image data DATA1 by rearranging input data (or raw image data) provided from the external source (e.g., a graphic processor) and provide image data DATA1 to the data driver 300.

In an exemplary embodiment, the timing controller 400 may determine whether the input data includes a predetermined image pattern, generate a pattern inversion control signal, and output the pattern inversion control signal to the data driver 300 when the input data includes the predetermined image pattern. In one example, the predetermined image pattern may be a pattern having a same grayscale value for a specific region of the display panel.

The timing controller 400 may compensate input data using compensation data to mitigate non-uniformity in luminance of the display panel 100 due to an imbalance between pixels. The compensation data may include compensation values for each pixel (i.e., compensation values acquired through optical compensation technology using an imaging device), which may be calculated based on the actual luminance of the display panel 100 measured using an imaging device during the manufacturing process of the display device 10.

However, despite the compensation of the input data in the timing controller 400, the input data may not be completely compensated by compensation operation of the timing controller 400. Also, compensation error and deterioration in display quality due to the compensation error (e.g., an unintended vertical line in a display image) may occur due to various disposition structures of the pixels and various connection structures between the pixels and data drive ICs.

Accordingly, the timing controller 400 may generate a pattern inversion control signal by determining whether an image pattern that causes deterioration in display quality, or allows the deterioration in the display quality, is included in the input data. In response to the pattern inversion control signal, the data driver 300 may replace a data signal (or a channel data), provided in regions of the display panel 100 where deterioration in display quality is expected, with a data signal in other regions where the deterioration in the display quality does not occur. Thus, the deterioration in display quality may be alleviated or may be prevented from becoming visible to the user.

As described with reference to FIG. 1, the display device 10 may determine whether or not the input data includes an image pattern causing deterioration in the display quality (e.g., an unintentional vertical line in the display image) using the timing controller 400, and may replace a data signal (or channel data corresponding to a data signal) provided in some regions (e.g., a boundary between sub-display regions, connected to different data drive ICs) of the display panel 100 where deterioration in display quality is expected with a data signal in other regions where the deterioration in the display quality does not occur by using the data driver 300.

Figure 2A:
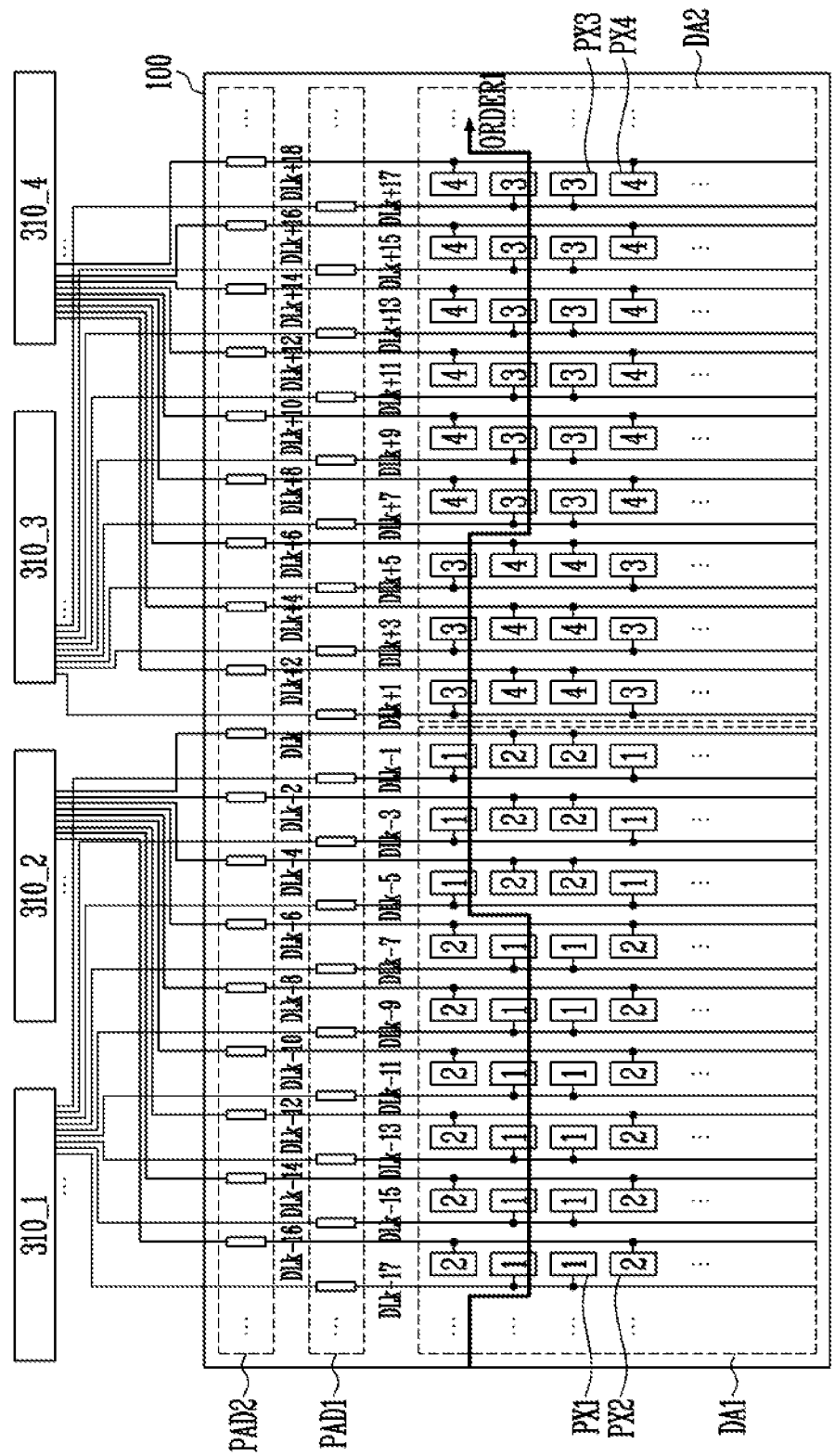
Figure 2C:
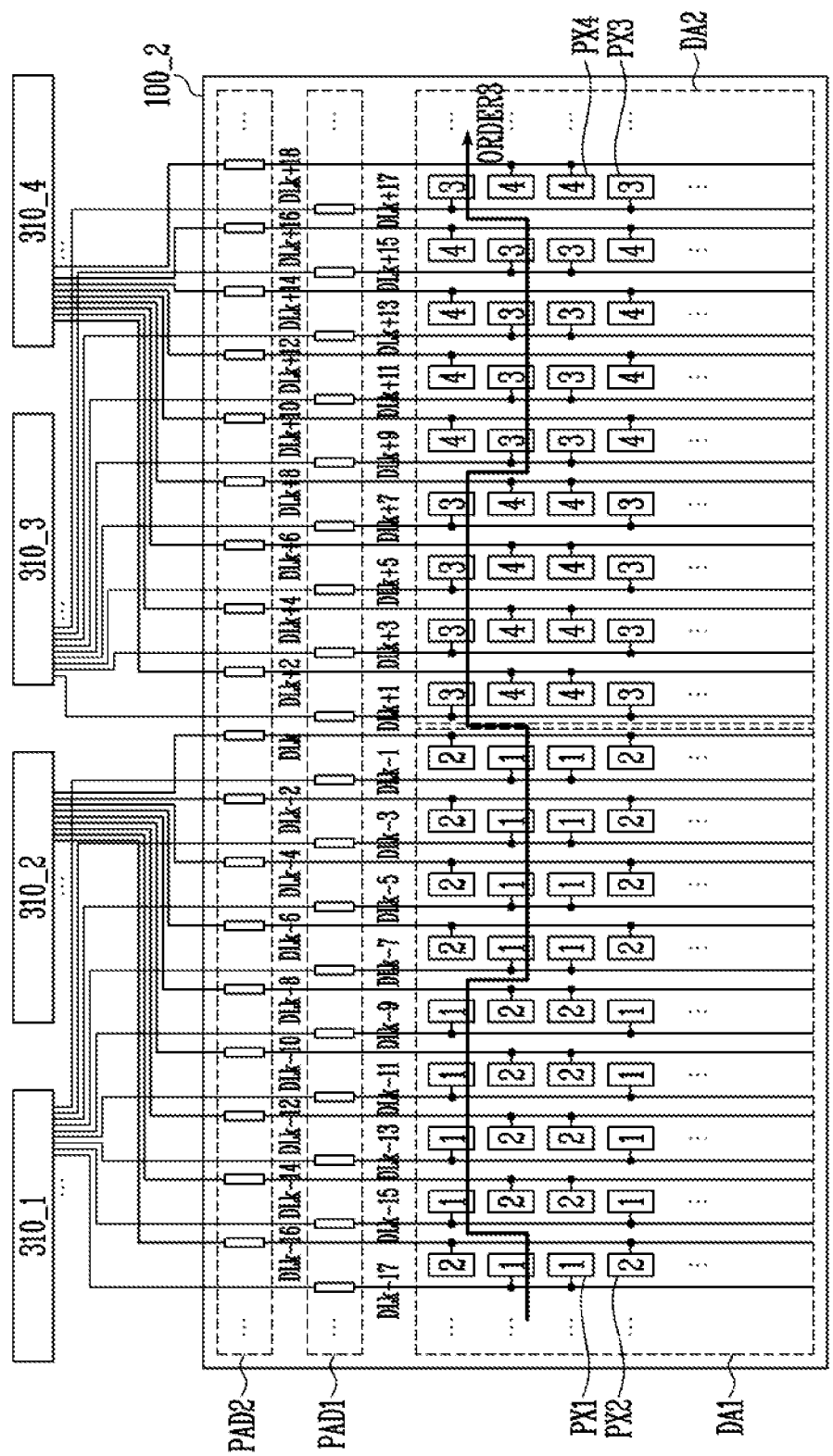

FIGS. 2A to 2C are drawings showing an example of the display device shown in FIG. 1 according to exemplary embodiments of the present invention. Specifically, FIGS. 2A to 2C show the connection relationship between the pixels in a first region A1 of the display panel 100 and the data drive ICs 310_1 to 310_4. The first region A1 may include a boundary region between a first sub-display region DA1 (or a first display region) and a second sub-display region DA2 (or a second display region).

Referring to FIGS. 1 and 2A, the display panel 100 may include first to fourth sub-pixels PX1 to PX4. Here, a first sub-pixel PX1 may be a sub-pixel connected to a first data drive IC 310_1, a second sub-pixel PX2 may be a sub-pixel connected to a second data drive IC 310_2, a third sub-pixel PX3 may be a sub-pixel connected to a third data drive IC 310_3, and a fourth sub-pixel PX4 may be a sub-pixel connected to a fourth data drive IC 310_4. The first sub-pixel PX1 and the second sub-pixel PX2 may be substantially the same as the first pixel P1 and second pixel P2 shown in FIG. 1, respectively.

In addition, the display panel 100 may further include a first pad unit PAD1 and a second pad unit PAD2. The first pad unit PAD1 may include a plurality of pads arranged in the row direction, and the second pad unit PAD2 may include a plurality of pads spaced apart from the first pad unit PAD1 and arranged in the row direction. The pads of the first pad unit PAD1 and the pads the second pad unit PAD2 may be staggered in the column direction.

The first sub-pixel PX1 may be connected to odd-numbered data lines DLk−17 to DLk−1 (where k is an integer of 18 or more) in the first sub-display region DA1, and the odd-numbered data lines DLk−17 to DLk−1 may be connected to the first data drive IC 310_1 through the first pad unit PAD1. The second sub-pixel PX2 may be connected to even-numbered data lines DLk−16 to DLk in the first sub-display region DA1, and the even-numbered data lines DLk−16 to DLk may be connected to the second data drive IC 310_2 through the second pad unit PAD2. Similarly, the third sub-pixel PX3 may be connected to odd-numbered data lines DLk+1 to DLk+17 in the second sub-display region DA2, and the odd-numbered data lines DLk+1 to DLk+17 may be connected to the third data drive IC 310_3 through the first pad unit PAD1. The fourth sub-pixel PX4 may be connected to even-numbered data lines DLk+2 to DLk+18 in the second sub-display region DA2, and the even-numbered data lines DLk+2 to DLk+18 may be connected to the fourth data drive IC 310_4 through the second pad unit PAD2.

The first sub-pixel PX1 and the second sub-pixel PX2 included in a pixel column may be connected to data lines different from each other. Therefore, the first sub-pixel PX1 and the second sub-pixel PX2 can simultaneously record data signals with sufficient time, and thus the display device 10 can implement higher image quality on a larger screen.

The first sub-pixel PX1 may be arranged alternatively in the row direction at two adjacent pixel rows within the first sub-display region DA1. For example, the first sub-pixel PX1 may be arranged alternately in a first pixel row and a second pixel row by six along a first arrangement order ORDER1 shown in FIG. 2A. However, the present invention is not limited thereto. For example, when a unit pixel consists of three types of sub-pixels that emit red, blue, and red, respectively, three first sub-pixels PX1 may constitute one unit pixel and be arranged alternately at the first pixel row and the second pixel row for each unit pixel in the second arrangement order ORDER2 as shown in FIG. 2B. For another example, when a unit pixel consists of four types of sub-pixels that emit red, blue, green, and white, respectively, four first sub-pixels PX1 may constitute one unit pixel and be arranged alternately at the first pixel row and the second pixel row for each unit pixel in the third arrangement order ORDER3 as shown in FIG. 2C.

Similarly, the second sub-pixel PX2 may be arranged alternately in the row direction at two adjacent pixel rows in the first sub-display region DA1, and the third sub-pixel PX3 and the fourth sub-pixel PX4 may be arranged alternately or staggered in the row direction at two adjacent pixel rows in the second sub-display region DA2. In addition, the four pixel rows shown in FIG. 2A may be repeatedly disposed in the column direction.

When the display panel 100 is implemented as a liquid crystal panel, it may be driven in a dot inversion driving method of the display panel 100 only by a pixel arrangement structure, thereby preventing a flicker such as a vertical stripe pattern.

However, as described with reference to FIG. 1, as the first pixel PX1 connected to the first data drive IC 310_1 is staggered to the two pixel rows, a first line data applied to the first pixel row and the second line data applied to a second pixel row must be mixed with each other. For example, data signals output at one time in the first data drive IC 310_1 may be generated to include a portion of the first line data and a portion of the second line data corresponding to the first arrangement order ORDER1.

In consideration of load of the timing controller 400, the timing controller 400 may generate the image data DATA1 by compensating the input data, and two line data may be then intermixed or rearranged (or re-mapped) through a separate buffer (e.g., a buffer implemented in a field-programmable gate array (FPGA)) and the image data DATA1 including the rearranged line data may be provided to the data drive ICs 310_1 to 310_4.

In a case where the timing controller 400 compensates for the input data before the first line data and the second line data are remapped, compensation errors may occur.

For example, the display panel 100 may be divided into a plurality of compensation regions based on a compensation block of a specific size. The compensation block may represent a range in which luminance can be measured by an optical compensation system (or an imaging device, not shown), for example, correspond to 8*8 sub-pixels or to 16*8 sub-pixels. A compensation value for each compensation region (i.e., a grayscale value for compensating for the difference between actual luminance and ideal luminance of the corresponding compensation region) and compensation data including the compensated value can be calculated by the optical compensation system, and the compensation data may be stored in a separate memory device (not shown) of the display device 10.

The timing controller 400 may calculate a compensation value for each of the grayscale values included in the input data by interpolating predetermined compensation values in the compensation regions, and may compensate the input data by adding the compensation value to the corresponding grayscale value. However, coordinates of the pixels in the image captured by the optical compensation system may not match coordinates of the grayscale values in the input data corresponding to the pixels. Therefore, a compensation error may occur for the input data.

In addition, as the odd-numbered data drive ICs 310_1 and 310_3 and the even numbered data drive ICs 310_2 and 310_4 separately input data signals, the display quality may be deteriorated (e.g., vertical stripes) or seen by the user in the boundary region (i.e., some regions adjacent to the boundary between the sub-display regions) of the display panel 100 receiving the data signal from the four data drive ICs 310_1 to 310_4 different from each other.

Therefore, the display device 10 can alleviate deterioration in display quality due to compensation errors of input data by replacing adjacent channel data with some channel data (i.e., data corresponding to data signals provided on some data lines) included in the image data.

FIG. 3 is a drawing illustrating replacement of channel data by a data driver included in the display device shown in FIG. 1 according to exemplary embodiments of the present invention. FIG. 3 shows the relationship between the channel data based on the data lines on the display panel 100_2 of FIG. 2C. The channel data may be included in image data provided to the data driver 300 and may correspond to each of the data lines before being converted into a data signal.

Referring to FIGS. 2C and 3, the deterioration in the display quality may be expected in the boundary region A_B including 16 data lines based on a boundary line BL of the two sub-display regions of the display panel 100.

In this case, each of the data drive ICs IC_ODD1, IC_ODD2, IC_EVEN1, and IC_EVEN2 may replace channel data corresponding to the boundary region A_B with adjacent channel data.

For example, a first odd-numbered data drive IC IC_ODD1 (e.g., the first data drive IC 310_1 of FIG. 2C) may replace the n-3-th to n-th channel data CHn-3 to CHn with the n-7-th to n-4-th channel data CHn-7 to CHn-4. In addition, a second odd-numbered data drive IC IC_ODD2 (e.g., the third data drive IC 310_3 of FIG. 2C) may replace first to fourth channel data CH1 to CH4 with fifth to eighth channel data CH5 to CH8. The channel data in replacement relationship may be channel data of the same type. For example, the first channel data and the fifth channel data may be data corresponding to sub-pixels that emit a first color, and the second channel data and the sixth channel data may be data corresponding to sub-pixels that emit a second color.

Similarly, a first even-numbered data drive IC IC_EVEN1 (e.g., the second data drive IC 310_2 of FIG. 2C) may replace the n-3-th to n-th channel data CHn-3 to CHn with the n-7-th to n-4-th channel data CHn-7 to CHn-4. In addition, a second even-numbered data drive IC IC_EVEN2 (e.g., the fourth data drive IC 310_4 of FIG. 2C) may replace the first to fourth channel data CH1 to CH4 with the fifth to eighth channel data CH5 to CH8.

That is, each of the data drive ICs IC_ODD1, IC_ODD2, IC_EVEN1, and IC_EVEN2 may replace the first to fourth channel data CH1 to CH4, which are served by the corresponding data drive ICs and are disposed at the outermost portion of the sub-display region (or closest to other sub-display regions) with the fifth to eighth channel data CH5 to CH8 adjacent thereto, and may replace the n-3-th to n-th channel data CHn-3 to CHn with the n-7-th to n-4-th channel data CHn-7 to CHn-4.

The display device 10 is shown to replace four channel data on both sides of the data drive ICs IC_ODD1, IC_ODD2, IC_EVEN1, and IC_EVEN2 with adjacent channel data in FIG. 3, but this is only illustrative and the display device 10 is not limited thereto. For example, when the boundary region A_B where the deterioration in the display quality is expected corresponds to a total of 4N channel data (N is a positive integer), N channel data on both sides of each of data drive ICs IC_ODD2, IC_EVEN1, IC_EVEN2 may be replaced with N channel data adjacent thereto.

Figure 4:
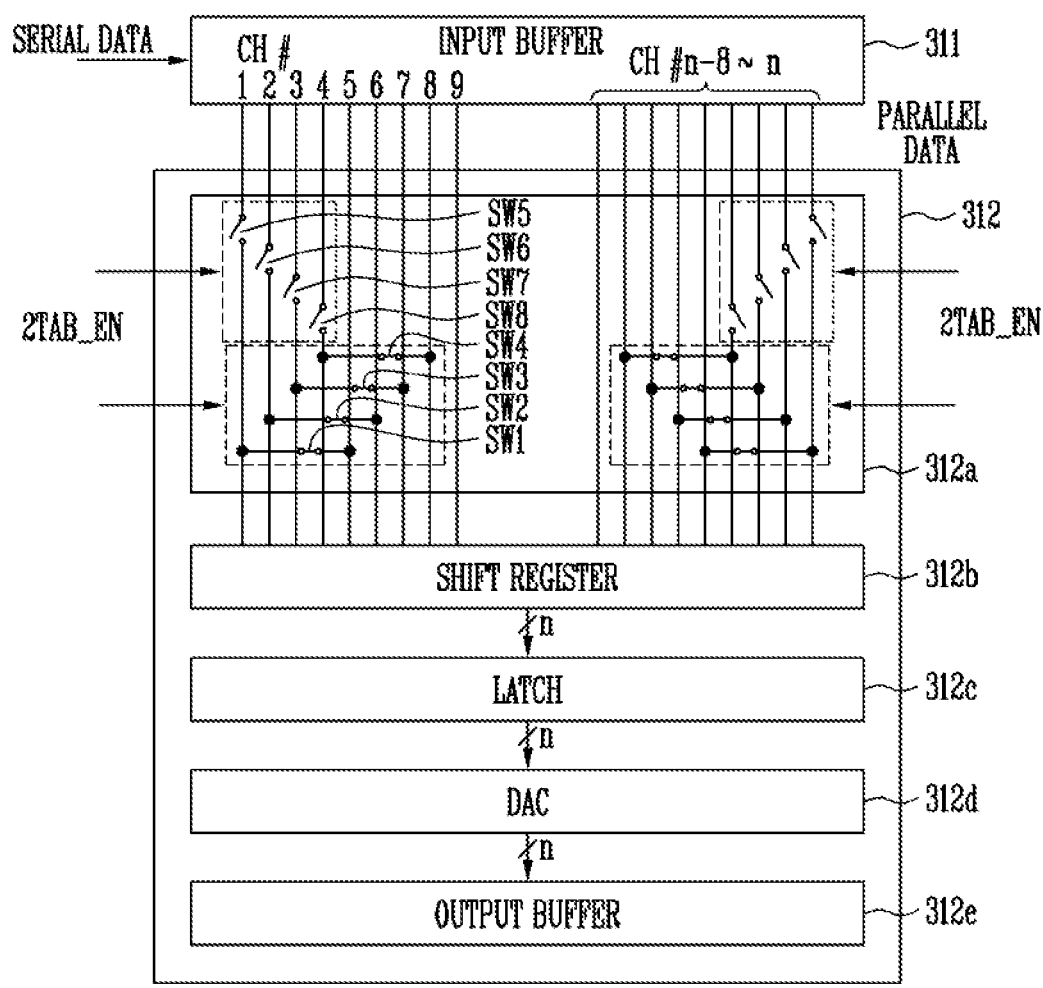
FIG. 4 is a block diagram showing an example of a data driver included in the display device shown in FIG. 1 according to exemplary embodiments of the present invention.

FIG. 4 is a block diagram showing an example of a data driver included in the display device shown in FIG. 1 according to exemplary embodiments of the present invention, FIG. 4 shows a data drive IC included in the data driver 300, and the data drive ICs 310_1 to 310_2M included in the data driver 300 shown in FIG. 1 may be substantially the same as the data driver (or the data drive IC) in FIG. 4.

Referring to FIGS. 1 and 4, the data driver 300 (or the data drive IC) may include an input buffer 311 and an image signal processor 312.

The input buffer 311 may rearrange image data SERIAL DATA (or packet data), which is serially transmitted from the timing controller 400 through one signal transmission line (or a pair of signal transmission lines), in parallel corresponding to the data lines to output parallel data PARALLEL DATA.

The image signal processor 312 may generate a data signal based on parallel data PARALLEL DATA. The image signal processor 312 may include a logic controller 312a (or a switching circuit), a shift register 312b, a data latch 312c, a digital-to-analog converter (DAC) 312d, and an output buffer 312e.

The logical controller 312a may transmit the parallel data PARALLEL DATA to the shift register 312b and replace some channel data of the channel data included in the parallel data PARALLEL DATA with adjacent channel data in response to the pattern inversion control signal 2TAB_EN provided from the timing controller 400.

As shown in FIG. 4, the logic controller 312a may include first to eighth switches SW1 to SW8 (or first to eighth switching elements).

The first switch SW1 may be connected between a first channel line corresponding to a first channel CH1 (i.e., an output terminal outputting the first channel data) of the input buffer 311 and a fifth channel line. When a pattern inversion control signal 2TAB_EN is at a first voltage level (e.g., a logic low level), the first switch SW1 may maintain a turn-off state, and when the pattern inversion control signal 2TAB_EN is at a second voltage level (e.g., a logic high level), the first switch SW1 may be turned on to connect the first channel line and the fifth channel line.

Similarly, the second switch SW2 may be connected between the second channel line corresponding to the second channel CH2 of the input buffer 311 and the sixth channel line, and may connect the second channel line and the sixth channel line in response to the pattern inversion control signal 2TAB_EN of the second voltage level. The third switch SW3 may connect the third channel line and the seventh channel line of the input buffer 311 in response to the pattern inversion control signal 2TAB_EN of the second voltage level, and the fourth switch SW4 may connect the fourth channel line and the eighth channel line of the input buffer 311 in response to the pattern inversion control signal 2TAB_EN of the second voltage level.

The fifth switch SW5 may be connected between the first channel CH1 of the input buffer 311 and the first channel line. When the pattern inversion control signal 2TAB_EN is at the first voltage level (e.g., a logic low level), the fifth switch SW5 may maintain the turn-on state to connect the first channel CH1 to the first channel line, and when the pattern inversion control signal 2TAB_EN is at a second voltage level (e.g., a logic high level), the fifth switch SW5 may be turned off to block connection between the first channel line and the fifth channel line.

Similarly, the sixth switch SW6 may be connected between the second channel CH2 of the input buffer 311 and the second channel line, the seventh switch SW7 may be connected between the third channel CH3 of the input buffer 311 and the third channel line, and the eighth switch SW8 may be connected between the fourth channel CH4 of the input buffer 311 and the fourth channel line. The sixth to eighth switches SW6 to SW8 may maintain the turn-on state when the pattern inversion control signal 2TAB_EN is at the first voltage level, and may be turned off when the pattern inversion control signal 2TAB_EN is at the second voltage level.

In an exemplary embodiment, the first to fourth switches SW1 to SW4 may be implemented as transistors of types different from the fifth to eighth switches SW5 to SW8. For example, each of the first to fourth switches SW1 to SW4 may be a PMOS transistor, and each of the fifth to eighth switches SW5 to SW8 may be an NMOS transistor.

The logic controller 312a may further include switches connected to the n-7-th to nth channels CHn-7 to CHn and/or the n-7-th to nth channel lines of the input buffer 311 corresponding to the first to eighth switches SW1 to SW8. Since the switches are symmetrical with the first to eighth switches SW1 to SW8, duplicate descriptions will be omitted.

The logic controller 312a may directly transmit the channel data provided from the ninth to n-8-th channels of the input buffer 311 to the shift register 312b regardless of a voltage level of the pattern inversion control signal 2TAB_EN.

The shift register 312b may sequentially provide data (or partially replaced parallel data) provided to the logical controller 312a to the data latch 312c.

The data latch 312c may latch the sequentially received data from the shift register 312b and simultaneously provide the data to the digital-to-analog converter DAC 312d.

The digital-to-analog converter DAC 312d can convert a digital type of data to an analog type of data signal (or data voltage) based on gamma voltages.

The output buffer 312e can select a polarity of the data signal to output it to the data lines. For example, the output buffer 312e may select and output one of a positive data voltage and a negative data voltage corresponding to the data signal.

As described with reference to FIG. 4, the data driver 300 (or the data drive IC) may generate a data signal by replacing some channel data with adjacent channel data using the switches SW1 to SW4 connected between some channel lines in response to the pattern inversion control signal 2TAB_EN.

Meanwhile, FIG. 4 shows a data driver that replaces four channel data with adjacent four channel data corresponding to replacement of channel data of FIG. 3, but the data driver is not limited thereto. Another exemplary embodiment of a data driver that replaces channel data will be described later with reference to FIGS. 7 and 8.

Figure 5:
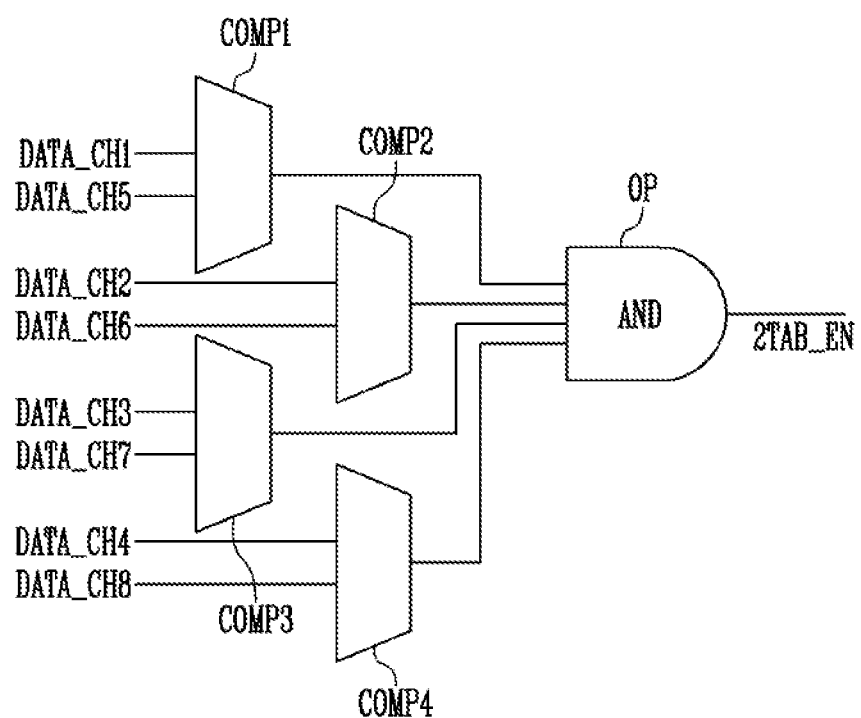
FIG. 5 is a block diagram showing an example of a timing controller included in the display device shown in FIG. 1 according to exemplary embodiments of the present invention.

FIG. 5 is a block diagram showing an example of a timing controller included in the display device shown in FIG. 1 according to exemplary embodiments of the present invention. FIG. 5 shows a logic circuit that detects an image pattern (i.e., an image pattern causing deterioration in display quality in the display device shown in FIGS. 2A to 2C) described with reference to FIG. 1.

Referring to FIGS. 4 and 5, the timing controller (or the logic circuit) may include data comparators COMP1 to COMP4 and an operator OP.

A first comparator COMP1 can compare a first channel data value DATA_CH1 (or a first grayscale value) corresponding to the first channel data with a fifth channel data value DATA_CH5 (or a fifth greyscale value). The first channel data value DATA_CH1 and the fifth channel data value DATA_CH5 may be included in the input data and correspond to the same pixel row of the display panel 100. The first comparator COMP1 may output a logical value of 1 when the first channel data value DATA_CH1 and the fifth channel data value DATA_CH5 are the same as each other, and output a logical value of 0 when the first channel data value DATA_CH1 and the fifth channel data value DATA CH are different from each other.

Similarly, a second comparator COMP2 may compare a second channel data value DATA_CH2 and a sixth channel data value DATA_CH6, a third comparator COMP3 may compare a third channel data value DATA_CH3 and a seventh channel data value DATA_CH7, and the fourth comparator COMP4 may compare a fourth channel data value DATA_CH4 and an eighth channel data value DATA_CH8.

The operator OP may calculate a logical conjunction of the first to fourth comparators COMP1 to COMP4 to generate the pattern inversion control signal 2TAB_EN. For example, when the channel data values between the corresponding channels are all the same, the timing controller 400 (or a logic circuit) may output the pattern inversion control signal 2TAB_EN of the first voltage level (or a logic low level).

The timing controller 400 is shown to compare only the first to eighth channel data values DATA_CH1 to DATA_CH8 in FIG. 5, but the embodiment is not limited thereto. For example, the timing controller 400 may additionally determine whether the n-7-th to n-th channel data values corresponding to n-7-th to nth channel data (see FIG. 4) are all the same and generate the pattern inversion control signal 2TAB_EN.

In an exemplary embodiment, the timing controller 400 may determine whether line data (i.e., data corresponding to one pixel row) includes an image pattern, and may determine whether or not to replace channel data for each line of input data and generate the pattern inversion control signal 2TAB_EN.

Figure 6:
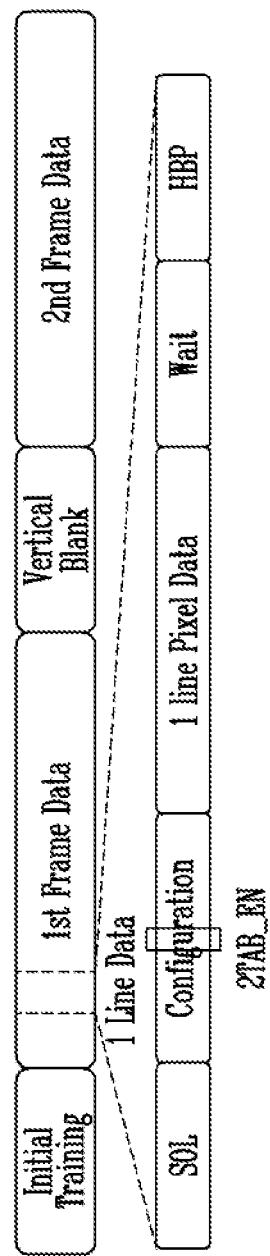
FIG. 6 is a drawing showing an example of packet data used in the display device shown in FIG. 1 according to exemplary embodiments of the present invention.

FIG. 6 is a drawing showing an example of packet data used in the display device shown in FIG. 1 according to exemplary embodiments of the present invention. FIG. 6 shows packet data transmitted from the timing controller 400 to the data driver 300 according to an intra-panel interface (e.g., USI-GF interface) between the timing controller 400 and the data driver 300 of FIG. 1. The packet data includes the second control signal CON2 and the image data DATA described with reference to FIG. 1.

Referring to FIG. 6, the packet data includes an initial training packet Initial Training for initializing the data driver 300 (see FIG. 1, or data drive ICs) and setting operation timing, a frame data packet 1st Frame Data and 2nd Frame Data for image data to be displayed for one frame, and a blanking period Vertical Blank of a vertical synchronization signal inserted between the frame data packet 1st Frame Data and 2nd Frame Data.

For example, a first frame data packet 1st Frame Data may include line data packets Line Data, and one line data packet 1 Line Data may include a setting signal Configuration including a polarity control signal and line data 1 Line Pixel Data corresponding to a pixel column. Herein, the pattern inversion control signal 2TAB_EN may be inserted into the line data packet as one of the setting signals Configuration. For example, one bit for enable signal and disable signal indicating whether the channel data is replaced may be allocated.

That is, the timing controller 400 may generate a pattern inversion control signal 2TAB_EN for each line data (i.e., one pixel row) and provide it to the data driver 300. Accordingly, the data driver 300 may replace only the channel data corresponding to a specific pixel row rather than the entire frame, which may mitigate or eliminate deterioration in display quality (e.g., vertical lines capable of occurring partially within one frame image), and prevent deterioration in display quality due to replacement of channel data within a frame image.

Figure 7:
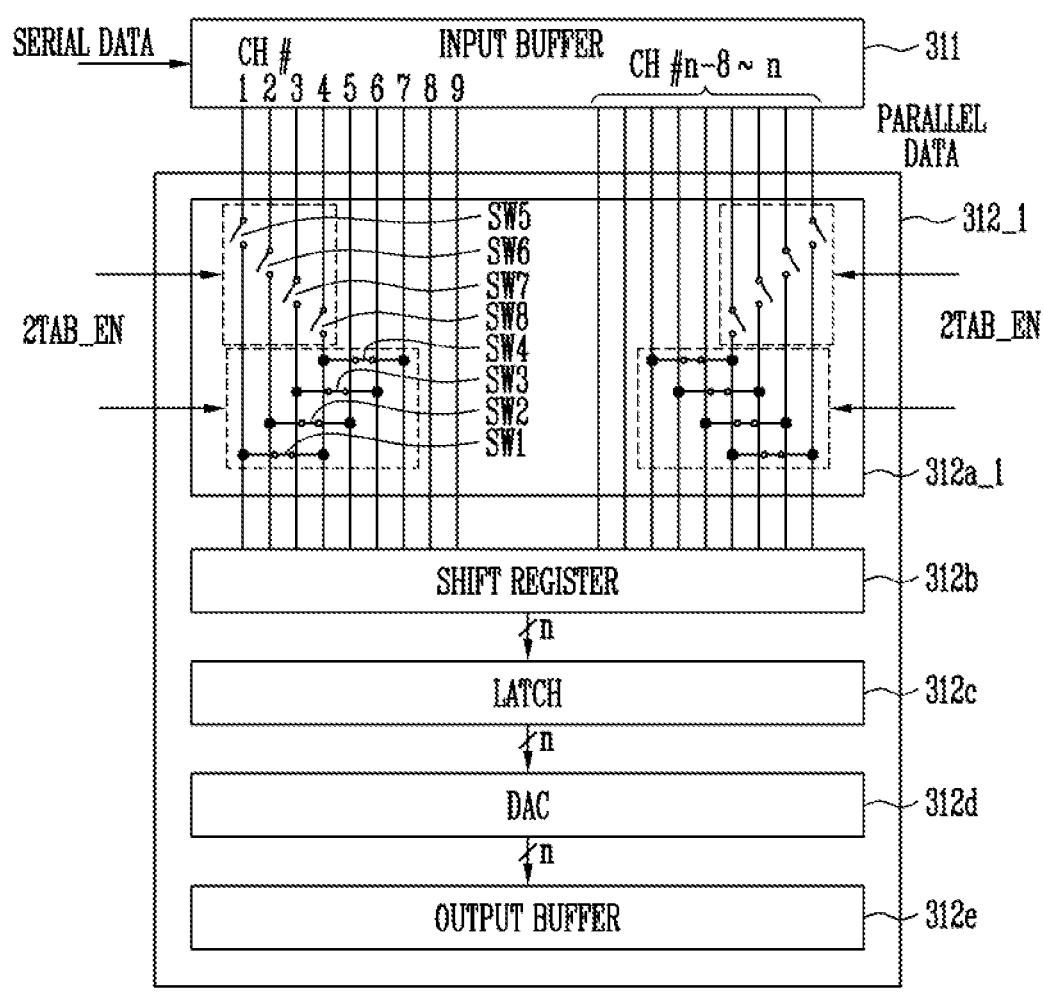
FIG. 7 is a block diagram showing another example of a data driver included in the display device shown in FIG. 1 according to exemplary embodiments of the present invention.
Figure 8:
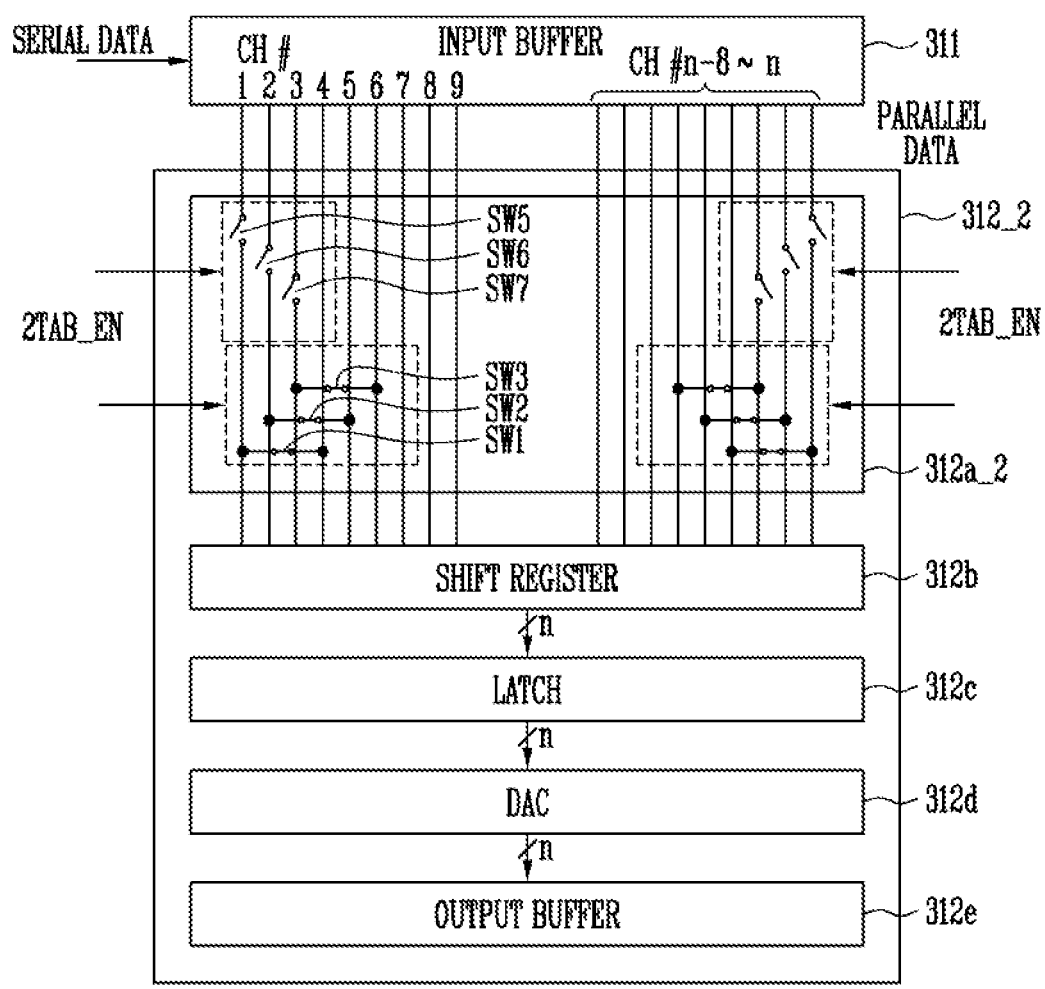
FIG. 8 is a block diagram showing another example of a data driver included in the display device shown in FIG. 1 according to exemplary embodiments of the present invention.

FIG. 7 is a block diagram showing another example of a data driver included in the display device shown in FIG. 1 according to exemplary embodiments of the present invention. FIG. 8 is a block diagram showing yet another example of a data driver included in the display device shown in FIG. 1 according to exemplary embodiments of the present invention.

First, referring to FIGS. 4 and 7, the data driver of FIG. 7 may be substantially the same as or similar to the data driver of FIG. 4, except that it includes a different image signal processor 312_1 (including the logic controller 312a_1). Therefore, duplicate descriptions will be omitted.

The logic controller 312a_1 may replace some of the channel data included in the parallel data PARALLEL DATA with adjacent channel data in response to the pattern inversion control signal 2TAB_EN provided from the timing controller 400.

The logical controller 312a shown in FIG. 4 may replace the first to fourth channel data with the fifth to eighth channel data, whereas the logical controller 312a_1 shown in FIG. 7 may replace the first to fourth channel data with the fifth to seventh channel data.

For example, the display panel 100 and 100_1 shown in FIGS. 2A and 2B may have an RGB stripe pixel structure, and deterioration in display quality of the display panel 100 and 100_1 may be expected corresponding to a total of eight pixel rows adjacent to a boundary between the first and second sub-display regions DA1 and DA2. In this case, the logical controller 312a_1 may replace the first channel data (and fourth channel data) with the seventh channel data that has the same type as the first channel data (and the fourth channel data) and for which no compensation error is expected. For example, the first channel data corresponding to a sub-pixel emitting the first color may be replaced with the seventh channel data corresponding to a sub-pixel emitting the first color.

Similarly, the logical controller 312a_1 may replace the second channel data with the same type of fourth channel data, and may replace the third channel data with the same type of fifth channel data.

The logic controller 312a_1 may include first to eighth switches SW1 to SW8. Fifth to eighth switches SW5 to SW8 may be substantially the same as the fifth to eighth switches SW5 to SW8 described with reference to FIG. 4.

The first switch SW1 may be connected between the first channel line corresponding to the first channel CH1 of the input buffer 311 and the fourth channel line, the second switch SW2 may be connected between the second channel line and the fifth channel line, the third switch SW3 may be connected between the third channel line and the sixth channel line, and the fourth switch SW4 may be connected between the fourth channel line and the seventh channel line. The first to fourth switches SW1 to SW4 may be turned on in response to a pattern inversion control signal 2TAB_EN having a second voltage level (e.g., a logic high level) to connect the channel lines corresponding thereto.

Therefore, the first to fourth channel data may be replaced with the fifth to seventh channel data (i.e., channel data of the same type with no compensation error expected), deterioration in display quality may be alleviated and may not be seen by the user.

Referring to FIGS. 4 and 8, the data driver of FIG. 8 may be substantially the same as or similar to the data driver of FIG. 4, except that it includes a different image signal processor 312_2 (including the logic controller 312a_2). Therefore, duplicate descriptions will be omitted.

The logical controller 312a_1 shown in FIG. 7 may replace the first to fourth channel data with the fifth to eighth channel data, and the logical controller 312a_2 shown in FIG. 8 may replace the first to third channel data with the fourth to sixth channel data.

For example, the display panel 100 and 100_1 shown in FIGS. 2A and 2B may have an RCB stripe pixel structure, and deterioration in display quality of the display panel 100 and 100_1 may be expected corresponding to a total of six pixel rows adjacent to a boundary between the first and second sub-display regions DA1 and DA2. In this case, the logical controller 312a_2 may replace the first channel data with the fourth channel data that has the same type as the first channel data and for which no compensation error is expected. Similarly, the logical controller 312a_2 may replace the second channel data with the same type of fourth channel data, and may replace the third channel data with the same type of fifth channel data.

The logic controller 312a_2 may include first to third switches SW1 to SW3 and fifth to seventh switches SW5 to SW7. First to third switches SW1 to SW3 and fifth to seventh switches SW5 to SW7 may be substantially the same as the first to third switches SW1 to SW3 and the fifth to seventh switches SW5 to SW7 described with reference to FIG. 7.

As described with reference to FIGS. 7 and 8, the data driver may replace the channel data corresponding to the boundary region where deterioration in display quality is expected with adjacent channel data adjacent to the boundary region, and the corresponding channel data may be replaced with adjacent channel data of the same type.

The drawing and the detailed description of the present invention referred to above are descriptive sense only and are used for the purpose of illustration only and are not intended to limit the meaning thereof or to limit the scope of the invention described in the claims. Accordingly, a person having ordinary skill in the art will understand from the above that various modifications and other equivalent embodiments are also possible. Therefore, the real protective scope of the present invention shall be determined by the technical scope of the accompanying claims.

What is claimed is:

1. A display device comprising:
   a display panel that includes a first pixel and a second pixel included in a pixel column and a plurality of data lines, wherein a first data line of the data lines is connected to the first pixel and a second data line of the data lines is connected to the second pixel;
   a timing controller that generates a pattern inversion control signal by detecting a predetermined image pattern from input data;
   a first source driver that is connected to the first data line and a third data line of the data lines, and replaces a first channel data corresponding to the first data line with a third channel data corresponding to the third data line in response to the pattern inversion control signal; and
   a second source driver that is connected to the second data line and a fourth data line of the data lines, and replaces a second channel data corresponding to the second data line with a fourth channel data corresponding to the fourth data line in response to the pattern inversion control signal,
   wherein the first source driver is connected to a fifth data line of the data lines, and
   the first source driver does not replace a fifth channel data corresponding to the fifth data line with other channel data while replacing the first channel data with the third channel data.

2. The display device of claim 1, wherein the first data line, the second data line, the third data line and the fourth data line are sequentially arranged.

3. The display device of claim 1, wherein the first source driver includes
   an input buffer that converts line data transmitted from the timing controller through a pair of signal transmission lines into parallel data corresponding to the data lines; and
   an image signal processor that generates data signals based on the parallel data,
   wherein the line data is generated based on the input data in the timing controller, and
   the parallel data includes the first channel data and the third channel data, and
   wherein the image signal processor includes
   channel lines and
   a first switch connected between a first channel line corresponding to the first channel data and a third channel line corresponding to the third channel data of the channel lines.

4. The display device of claim 3, wherein the image signal processor further includes a second switch connected between the first channel of the input buffer outputting the first channel data and the first channel line.

5. The display device of claim 4, wherein when the pattern inversion control signal is at a logic high level, the first switch is turned on and the second switch is turned off.

6. The display device of claim 4, wherein when the pattern inversion control signal is at a logic low level, the first switch is turned off and the second switch is turned on.

7. The display device of claim 4, wherein the image signal processor further includes a third switch connected between a fifth channel line corresponding to a fifth channel data of the channel lines and the third channel line.

8. The display device of claim 3, wherein the line data corresponds to one pixel row in the display panel, and the line data includes the pattern inversion control signal.

9. The display device of claim 1, wherein the timing controller includes
   a first comparator that compares the first channel data with the third channel data,
   a second comparator that compares the second channel data with the fourth channel data, and
   a logic operator that generates the pattern inversion control signal by calculating a logical conjunction of an output of the first comparator and an output of the second comparator.

10. A display device comprising:
    a display panel that includes a first pixel and a second pixel included in a pixel column and a plurality of data lines, wherein a first data line of the data lines is connected to the first pixel and a second data line of the data lines is connected to the second pixel;

a timing controller that generates a pattern inversion control signal by detecting a predetermined image pattern from input data;

a first source driver that is connected to the first data line and a third data line of the data lines, and replaces a first channel data corresponding to the first data line with a third channel data corresponding to the third data line in response to the pattern inversion control signal; and a second source driver that is connected to the second data line and a fourth data line of the data lines, and replaces a second channel data corresponding to the second data line with a fourth channel data corresponding to the fourth data line in response to the pattern inversion control signal, wherein the first data line, the second data line, the third data line and the fourth data line are sequentially arranged, the display panel includes a first display region and a second display region separated by the data lines, and the first data line and the second data line are provided in the first display region and are the closest to the second display region.

11. The display device of claim 10, further comprising a third source driver and a fourth source driver that are connected to data lines included in the second display region, wherein the third source driver is connected to a fifth data line and a seventh data line in the second display region, and replaces a fifth channel data corresponding to the fifth data line with seventh channel data corresponding to the seventh data line in response to the pattern inversion control signal, and the fourth source driver is connected to a sixth data line and an eighth data line in the second display region, and replaces a sixth channel data corresponding to the sixth data line with an eighth channel data corresponding to the eighth data line in response to the pattern inversion control signal.

12. The display device of claim 11, wherein the fifth data line and the sixth data line are provided in the second display region and are the closest to the first display region.

13. The display device of claim 10, wherein the display panel further includes a third pixel connected to the third data line and a fourth pixel connected to the fourth data line, wherein the second pixel and the third pixel are included in one pixel row, and the first pixel and the fourth pixel are included in one pixel row.

14. The display device of claim 13, wherein the first pixel and the second pixel emit a first color, and the third pixel and the fourth pixel emit a second color.

15. A display device comprising:

a display panel that includes data lines, first pixels connected to odd-numbered data lines of the data lines, and second pixels connected to even-numbered data lines of the data lines, wherein one of the first pixels and one of the second pixels are included in a pixel column;

a timing controller that generates a pattern inversion control signal based on input data;

a first source driver that is connected to the odd-numbered data lines and provides the same first data signal to a first odd-numbered data line of the odd-numbered data lines and a second odd-numbered data line adjacent to the first odd-numbered data line in response to the pattern inversion control signal; and a second source driver that connected to the even-numbered data lines and provides the same second data signal to a first even-numbered data line of the even-numbered data lines and a second even-numbered data line adjacent to the first even-numbered data line in response to the pattern inversion control signal, wherein the display panel includes a first display region and a second display region separated by the data lines, the first source driver and the second source driver are connected to data lines included in the first display region, the first odd-numbered data line is the closest to the second region of the odd-numbered data lines, and the second even-numbered data line is the closest to the second region of the even-numbered data lines.

16. The display device of claim 15, further comprising:

a third source driver and a fourth source driver that are connected to the data lines included in the second display region, wherein the third source driver and the fourth source driver are connected to data lines in the second display region, the third source driver provides the same third data signal to a third odd-numbered data line and a fourth odd-numbered data line adjacent to the third odd-numbered data line of the odd-numbered data lines in response to the pattern inversion control signal, and the fourth source driver provides the same fourth data signal to a third even-numbered data line and a fourth even-numbered data line adjacent to the third even-numbered data line of the even-numbered data lines in response to the pattern inversion control signal.

17. The display device of claim 15, wherein the display panel further includes a third pixel connected to the second odd-numbered data line and a fourth pixel connected to the second even-numbered data line, the one of the second pixels and the third pixel are included in one pixel row, and the one of the first pixels and the fourth pixel are included in one pixel row.

18. The display device of claim 17, wherein the first pixel and the second pixels emit a first color, and the third pixel and the fourth pixel emit a second color.

* * * * *